(12) United States Patent
Isaiah

(10) Patent No.: US 11,687,941 B2
(45) Date of Patent: Jun. 27, 2023

(54) SYSTEMS AND METHODS FOR DETECTION OF ONLINE PAYMENT MECHANISM FRAUD

(71) Applicant: nSure.ai Payment Assurance Ltd., Tel-Aviv (IL)

(72) Inventor: Ziv Isaiah, Tel-Aviv (IL)

(73) Assignee: nSure.ai Payment Assurance Ltd., Tel-Aviv (IL)

( * ) Notice: Subject to any disclaimer, the term of this patent is extended or adjusted under 35 U.S.C. 154(b) by 0 days.

(21) Appl. No.: 17/396,809

(22) Filed: Aug. 9, 2021

(65) Prior Publication Data
US 2022/0036364 A1 Feb. 3, 2022

Related U.S. Application Data

(63) Continuation of application No. 15/648,551, filed on Jul. 13, 2017, now abandoned.

(51) Int. Cl.
*G06Q 20/00* (2012.01)
*G06Q 20/40* (2012.01)
*G06Q 20/38* (2012.01)

(52) U.S. Cl.
CPC ..... *G06Q 20/4016* (2013.01); *G06Q 20/3821* (2013.01); *G06Q 20/405* (2013.01)

(58) Field of Classification Search
CPC ........ G06Q 20/04; G06Q 20/32; G06Q 20/34; G06Q 20/40; G06Q 20/0453; G06Q 20/342; G06Q 20/3276; G06Q 20/3224; G06Q 20/405; G06Q 20/4016; G06Q 20/4018; G06Q 20/3821; G06Q 30/06;
(Continued)

(56) References Cited

U.S. PATENT DOCUMENTS 6,766,301 B1 7/2004 Daniel et al.
9,626,680 B1 * 4/2017 Ryan .................... G06Q 20/10
(Continued)

OTHER PUBLICATIONS

Advisory Action dated Jun. 10, 2020 from U.S. Appl. No. 15/648,551. (4 pages).
Communication Pursuant to Article 94(3) EPC dated Nov. 26, 2019 From the European Patent Office Re. Application No. 18183368.2. (9 Pages).
(Continued)

*Primary Examiner* — Jessica Lemieux
*Assistant Examiner* — Mohammed H Mustafa

(57) ABSTRACT

There is provided a method for detecting fraudulent use of monetary credentials during online transactions, comprising: receiving by a computing system, from a client terminal via a network, a request to obtain a digital voucher having a certain monetary equivalent using monetary credentials of a user, determining, a risk of malicious use of the monetary credentials according to an analysis of data denoting the context of the monetary credentials, providing, to the client terminal, a digital unusable voucher, wherein the digital unusable voucher is invalid for performing an online transaction, wherein the digital unusable voucher is structurally similar to a valid voucher that is valid for performing the online transaction, and identifying malicious use of the monetary credentials when within an elapsed predefined interval of time, no appeal in response to invalidity of the digital usable voucher during an attempt to perform the online transaction is received from the user.

9 Claims, 5 Drawing Sheets

(58) Field of Classification Search
CPC ........... G06Q 30/0609; G06Q 30/0635; G06Q 40/00; G06Q 50/00; G06Q 50/01
USPC .................................................. 705/4, 35–45
See application file for complete search history.

(56) References Cited

U.S. PATENT DOCUMENTS

| | | | |
|---|---|---|---|
| 2005/0278192 A1* | 12/2005 | Cantini | G06Q 20/10 705/39 |
| 2006/0202012 A1* | 9/2006 | Grano | G06Q 20/042 705/45 |
| 2010/0005013 A1* | 1/2010 | Uriarte | G06Q 40/02 705/44 |
| 2012/0284107 A1 | 11/2012 | Gemaat et al. | |
| 2016/0155101 A1* | 6/2016 | Zelkind | G06Q 20/405 705/44 |
| 2018/0005243 A1* | 1/2018 | Zovi | G06Q 20/405 |
| 2019/0019193 A1 | 1/2019 | Isiah | |

OTHER PUBLICATIONS

European Search Report and the European Search Opinion dated Sep. 18, 2018 From the European Patent Office Re. Application No. 18183368.2. (9 Pages).
Interview Summary dated Feb. 3, 2021 From U.S. Appl. No. 15/648,551. (2 Pages).
Official Action dated Feb. 6, 2020 From U.S. Appl. No. 15/648,551. (31 pages).
Official Action dated Apr. 28, 2021 from U.S. Appl. No. 15/648,551. (27 pages).
Official Action dated May 30, 2019 From U.S. Appl. No. 15/648,551. (27 Pages).
Official Action dated Oct. 5, 2020 from U.S. Appl. No. 15/648,551. (33 pages).
Summons to Attend Oral Proceedings Pursuant to Rule 115(1) EPC dated Sep. 18, 2020 From the European Patent Office Re. Application No. 18183368.2. (11 Pages).

* cited by examiner

SYSTEMS AND METHODS FOR DETECTION OF ONLINE PAYMENT MECHANISM FRAUD

RELATED APPLICATION

This application is a Continuation of U.S. patent application Ser. No. 15/648,551 filed on Jul. 13, 2017.

FIELD AND BACKGROUND OF THE INVENTION

The present invention, in some embodiments thereof, relates to payment mechanism fraud detection and, more specifically, but not exclusively, to systems and methods for detection and/or prevention of online payment mechanism fraud.

Payment mechanism credentials, for example, credit card numbers, may be obtained in an unauthorized manner. For example, credit card numbers may be stolen, obtained by hacking into websites storing credit card numbers, phishing, and other methods. Malicious users may use the authorized credit card numbers to purchase items online, without consent of the actual owner of the credit card.

SUMMARY OF THE INVENTION

The systems and/or methods described herein improve an underlying technical process within the technical field of digital security, optionally the field related to security of financial transactions over a network. The systems and/or methods described herein (e.g., analysis code executed by the processor(s)) relate to the technical problem of detecting fraudulent user of monetary credentials (e.g., credit card numbers, debit card numbers, payment card numbers, bank account numbers) to during online transactions (e.g., purchase products and/or services, which may be digital and/or physical, by using a client terminal to access an online purchasing application). The systems and/or methods describe herein provide a mechanism for merchants operating the online purchasing applications to identify additional malicious users using unauthorized monetary credentials, in addition to any existing security methods being implemented.

In particular, the technical problem may relate to detection of fraudulent use of unauthorized monetary credentials when such monetary credentials are otherwise validated by a validation server (e.g., a server of the credit card company, a server of the bank, a clearinghouse server), for example, detecting use of a stolen credit card number before the owner of the credit card becomes aware of the theft and reports the theft to the validation server. The systems and/or methods described herein (e.g., analysis code executed by the processor(s)) detect an attempt to maliciously use unauthorized monetary credentials that are validated by the validation server.

The system and/or methods described herein improve performance of computer(s) (e.g., client terminal, server hosting purchasing application) and/or network(s), by improving the ability to detect malicious use of unauthorized monetary credentials, using fewer processing resources (e.g., processor utilization), smaller amount of memory and/or storage space, shorter computation time, and/or a reduction in network traffic. The digital unusable voucher, which may be created using relatively few processing resources, has a small storage size, created in a short computation time, and/or requires few network resources for transmission, improves the ability to detect the malicious use, as described herein.

According to a first aspect, a method for detecting fraudulent use of monetary credentials during online transactions, comprises: receiving by a computing system, from a client terminal via a network, a request to obtain a digital voucher having a certain monetary equivalent using monetary credentials of a user, determining, by a hardware processor of the computing system, a risk of malicious use of the monetary credentials according to an analysis of data denoting the context of the monetary credentials, providing, to the client terminal via the network, a digital unusable voucher, wherein the digital unusable voucher is invalid for performing an online transaction, wherein the digital unusable voucher is structurally similar to a valid voucher that is valid for performing the online transaction, and identifying malicious use of the monetary credentials when within an elapsed predefined interval of time, no appeal in response to invalidity of the digital usable voucher during an attempt to perform the online transaction is received from the user.

According to a second aspect, a system for detecting fraudulent use of monetary credentials during online transactions, comprises: a malicious activity detection server comprising: a network interface for connecting to a client terminal over a network, a program store storing code, and at least one hardware processor coupled to the network interface and the program store for implementing the stored code, the code comprising: code to receive, from the client terminal via the network, a request to obtain a digital voucher having a certain monetary equivalent using monetary credentials of a user, code to determine a risk of malicious use of the monetary credentials according to an analysis of data denoting the context of the monetary credentials, and code to provide, to the client terminal via the network, a digital unusable voucher, wherein the digital unusable voucher is invalid for performing an online transaction, wherein the digital unusable voucher is structurally similar to a valid voucher that is valid for performing the online transaction, wherein malicious use of the monetary credentials is identified when within an elapsed predefined interval of time, no appeal in response to invalidity of the digital unusable voucher during an attempt to perform the online transaction is received from the user.

A computer program product comprising a non-transitory computer readable storage medium storing program code thereon for implementation by at least one hardware processor of a server in network communication with a client terminal, for detecting fraudulent use of monetary credentials during online transactions, comprises: program instructions to receive, from the client terminal via the network, a request to obtain a digital voucher having a certain monetary equivalent using monetary credentials of a user, program instructions to determine a risk of malicious use of the monetary credentials according to an analysis of data denoting the context of the monetary credentials, and program instructions to provide, to the client terminal via the network, a digital unusable voucher, wherein the digital unusable voucher is invalid for performing an online transaction, wherein the digital unusable voucher is structurally similar to a valid voucher that is valid for performing the online transaction, wherein malicious use of the monetary credentials is identified when within an elapsed predefined interval of time, no appeal in response to invalidity of the digital unusable voucher during an attempt to perform the online transaction is received from the user.

In a further implementation form of the first, second, and third aspects, a valid digital voucher having the certain monetary equivalent is provided to the client terminal via the network, when within the elapsed predefined interval of time, the appeal is received from the user.

In a further implementation form of the first, second, and third aspects, the monetary credentials are valid for performing the online transaction, and the determining of the risk of malicious use of the monetary credentials is triggered by validation of payment of the online transaction using the monetary credentials.

In a further implementation form of the first, second, and third aspects, the method further comprises and/or the processor is further configured to and/or the computer program product includes additional instructions for identifying authorized use of the monetary credentials when within the elapsed predefined interval of time, the appeal is received from the user.

In a further implementation form of the first, second, and third aspects, the method further comprises and/or the processor is further configured to and/or the computer program product includes additional instructions for storing in a data repository a profile of the user associated with authorized use of the monetary credentials, and automatically detecting authorized use of the monetary credentials according to the profile when the user provides another request to obtain another digital voucher using the monetary credentials.

In a further implementation form of the first, second, and third aspects, the method further comprises and/or the processor is further configured to and/or the computer program product includes additional instructions for providing a monetary refund to the user when within the elapsed predefined interval of time, the appeal is received from the user.

In a further implementation form of the first, second, and third aspects, the method further comprises and/or the processor is further configured to and/or the computer program product includes additional instructions for automatically providing a refund according to the certain monetary equivalent, to the user whose monetary credentials were maliciously being used when the malicious use is identified.

In a further implementation form of the first, second, and third aspects, the method further comprises and/or the processor is further configured to and/or the computer program product includes additional instructions for designating the user associated with the identified malicious use of the monetary credentials as a malicious user and rejecting future requests to obtain the digital voucher by the malicious user.

In a further implementation form of the first, second, and third aspects, the money credentials are selected from the group consisting of: a credit card number, a credit card expiration date, a credit card security code, a PIN (personal identification number), a debit card number, and a gift card number.

In a further implementation form of the first, second, and third aspects, the method further comprises and/or the processor is further configured to and/or the computer program product includes additional instructions for receiving additional data associated with at least one of the user and the monetary credentials, and wherein the analysis to determine the risk of malicious use of the monetary credentials is based on the additional data.

In a further implementation form of the first, second, and third aspects, the additional data includes one or more members selected from the group consisting of: third party data, empirically collected data, a profile of the user, behavior of the user, and contextual data.

In a further implementation form of the first, second, and third aspects, the data denoting the context of the monetary credentials includes one or more members selected from the group consisting of: a risk profile of the user, monetary credentials, the type of purchase, the value of the purchase, and the velocity of the use of the monetary credentials within the network.

In a further implementation form of the first, second, and third aspects, the determining the risk of malicious use is performed by a statistical classifier that classifies the monetary credentials to one of: a high risk category indicative of a high risk of malicious use, the high risk category triggers the providing the unusable voucher, and a low risk category indicative of a low or negligible risk of malicious use, the low risk category provides the valid voucher and aborts the providing the unusable voucher.

In a further implementation form of the first, second, and third aspects, the method further comprises and/or the processor is further configured to and/or the computer program product includes additional instructions for a very high risk category for classification by the statistical classifier, the very high risk category indicative of very high risk or certainty of malicious use, the very high risk category triggers identifying malicious use of the monetary credentials.

In a further implementation form of the first, second, and third aspects, the no appeal being received from the user within the elapsed predefined interval of time is detected by at least one of: lack of a phone call by the user to a help-line, closing of a window hosting an interface for entering the appeal, and explicit selection by the user of an icon representing a decision not to appeal.

In a further implementation form of the first, second, and third aspects, the method further comprises and/or the processor is further configured to and/or the computer program product includes additional instructions for storing in a data repository, the monetary credentials and the identified malicious use of the monetary credentials, and determining the risk of malicious use when the stored monetary credentials are used in another request to obtain another digital voucher.

In a further implementation form of the first, second, and third aspects, the method further comprises and/or the processor is further configured to and/or the computer program product includes additional instructions for storing in a data repository, data indicative of the user associated with the identified malicious use of the monetary credentials, and providing access to the data repository to other servers providing online transactions for blocking the user associated with the identified malicious use from performing online transactions.

In a further implementation form of the first, second, and third aspects, the online transaction comprises an online purchase of at least one of: a physical product, a physical service, a digital product, and a digital service.

In a further implementation form of the first, second, and third aspects, the digital unusable voucher is invalid for performing the online transaction by triggering a delay in delivery of a purchase of the online transaction, wherein the certain monetary equivalent associated with the digital unusable voucher is processed, wherein the malicious use of the monetary credentials are identified when within the elapsed predefined interval of time, no appeal in response to the delay of delivery of the purchase is received from the user.

In a further implementation form of the first, second, and third aspects, the network interface of the malicious activity detection server is in communication with a validation server over the network, wherein the validation server validates the monetary credentials for payment of the product, and the code to determine the risk of malicious use of the monetary credentials is triggered by the validation of the validation server.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
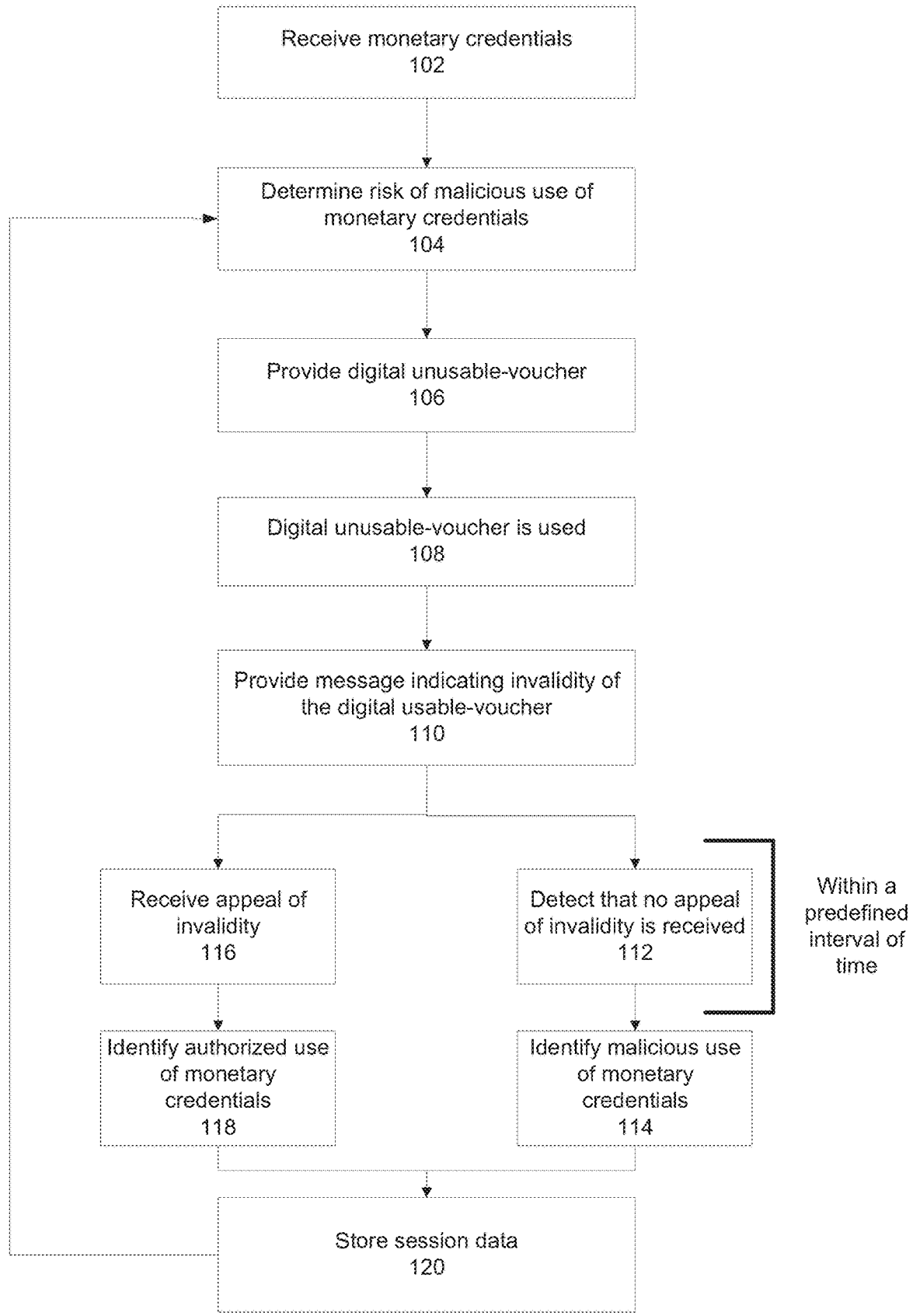
FIG. 1 is a flowchart of a method of detecting fraudulent user of monetary credentials by creating a digital unusable voucher, in accordance with some embodiments of the present invention.

The present invention, in some embodiments thereof, relates to payment mechanism fraud detection and, more specifically, but not exclusively, to systems and methods for detection and/or prevention of online payment mechanism fraud.

An aspect of some embodiments of the present invention relates to systems and/or methods and/or code instructions stored as code executed by a processor(s) for generating an invalid digital unusable voucher when risk of malicious use of monetary credentials (e.g., credit card number) is detected for a user using a client terminal to access a computing system over a network, requesting to obtain a digital voucher having a certain monetary equivalent with the monetary credentials. The invalid digital unusable voucher, which is structurally similar (e.g., indistinguishable to the user) to a valid digital voucher, is created and provided via the network to the client terminal of the user (which is determined to be of a statistically significant risk of being a malicious user) rather than a valid digital voucher. When the user enters the digital unusable voucher as of the process of performing an online transaction (e.g., using a client terminal accessing via a network an online server providing online transactions), the user is presented with a message indicating that the digital unusable voucher is invalid and cannot be used to perform the online transaction. The user is provided with an appeal interface that allows the user to make an appeal as to the invalidity of the digital unusable voucher, for example, instructions to contact a customer service representative for further investigation. Malicious use of the monetary credentials is identified when no appeal is received from the user within an elapsed predefined interval of time, for example, 24 hours, 1 week, or 1 month. The user and/or monetary credentials are identified as associated with malicious use.

The identification of malicious use is based on an assumption by the inventor(s) that malicious users using unauthorized monetary credentials will not appeal the invalidity for one or more reasons, for example, fear of getting caught when speaking with customer service representatives that may discover that the user is using a stolen credit card number, time waste, scalability, and limited return on investment (ROI). When conceptually considering the systems, methods, and/or code instructions described herein as an alarm system or a lock concept, one which malicious users may be able to bypass however by investing consideration additional time and/or effort. The systems, methods, and/or code instructions described herein may deter malicious users, by adding meaningful friction to the fraud process. It is noted that even if the systems, methods, and/or code instructions described herein are not 100% effective in preventing unauthorized use of monetary credentials, the systems, methods, and/or code instructions described add significant effectiveness to fraud detection. In the case where the user does appeal the invalidity (e.g., calls a help-desk), the user and/or monetary credentials are designated as being associated with authorized use. The identification of authorized use is based on the assumption by the inventor(s) that authorized users using authorized monetary credentials will appeal the invalidity to obtain a refund and/or receive a new valid voucher.

The digital unusable voucher may be used by servers hosting code instructions that perform online transactions (e.g., online store applications) which operate using valid vouchers issued by the computing system. In such online environments, users first enter the monetary credentials using a client terminal access the computing system over a network to receive a voucher. The user then access the server (e.g., online store) over the network using the client terminal to enter the voucher to perform the online transaction (e.g., purchase the product).

Optionally, the monetary credentials being used by the malicious user of request the digital voucher are valid monetary credentials. The monetary credentials may be validated by a clearinghouse, for example, a validation server of the credit card company, for example, in the case when the credit number has been stolen by the malicious user but not yet reported as stolen to the credit card company by the authorized user. The systems and/or methods described herein (e.g., analysis code executable by the processor(s)) provide an additional layer of security, to identify the malicious use of monetary credentials that are otherwise determined as valid for purchase of the product.

For example, a credit card number that was just stolen may be determined by the systems and/or methods described herein (e.g., analysis code executable by the processor(s)) to be associated with malicious use, even before the owner has become aware of the theft and/or reported the theft, and/or even before the credit card (e.g., validation server) is aware that the credit card is stolen. The validation server may be automatically notified when the malicious user is detected, to improve computational performance of identification of malicious users and/or maliciously used monetary credentials.

It is noted that the online transaction may be processed in a standard manner, with the funds transferred to the merchant, regardless of how the real owner of the monetary credentials reacts. The merchant that sold the product and/or service is fully protected and did not lose the product and/or service due to delivery of the invalid voucher.

The systems and/or methods described herein improve an underlying technical process within the technical field of digital security, optionally the field related to security of financial transactions over a network. The systems and/or methods described herein (e.g., analysis code executed by the processor(s)) relate to the technical problem of detecting fraudulent user of monetary credentials (e.g., credit card numbers, debit card numbers, payment card numbers, bank account numbers) to during online transactions (e.g., purchase products and/or services, which may be digital and/or physical, by using a client terminal to access an online purchasing application). The systems and/or methods describe herein provide a mechanism for merchants operating the online purchasing applications to identify additional malicious users using unauthorized monetary credentials, in addition to any existing security methods being implemented.

In particular, the technical problem may relate to detection of fraudulent use of unauthorized monetary credentials when such monetary credentials are otherwise validated by a validation server (e.g., a server of the credit card company, a server of the bank, a clearinghouse server), for example, detecting use of a stolen credit card number before the owner of the credit card becomes aware of the theft and reports the theft to the validation server. The systems and/or methods described herein (e.g., analysis code executed by the processor(s)) detect an attempt to maliciously use unauthorized monetary credentials that are validated by the validation server.

The system and/or methods described herein improve performance of computer(s) (e.g., client terminal, server hosting purchasing application) and/or network(s), by improving the ability to detect malicious use of unauthorized monetary credentials, using fewer processing resources (e.g., processor utilization), smaller amount of memory and/or storage space, shorter computation time, and/or a reduction in network traffic. The digital unusable voucher, which may be created using relatively few processing resources, has a small storage size, created in a short computation time, and/or requires few network resources for transmission, improves the ability to detect the malicious use, as described herein.

The systems and/or methods described herein generate new date, which is presented to the user within an interface associated with a client terminal, optionally a graphical user interface (GUI), in the form of the digital unusable voucher. The digital unusable voucher is structurally similar to a valid voucher which may be used to perform online transactions (e.g., purchase and/or redeem products and/or services), for example, similar in presentation (e.g., within a GUI on a display of a client terminal used by the user), similar in structure (e.g., pattern of letters and/or numbers), and/or similar in pattern (e.g., QR code or other code pattern). The digital unusable voucher is designed to be indistinguishable to the user from the digital unusable voucher. The digital unusable voucher is used to identify malicious use of monetary credentials when the user attempting to perform the online transaction with the digital unusable voucher fails to appeal the invalidity of the digital unusable voucher within the elapsed predefined time interval.

The systems and/or methods described herein provide a unique, particular, and advanced technique of identifying an attempt to maliciously use unauthorized monetary credentials to perform an online transaction. The systems and/or methods described herein use a new type of data structure, the digital unusable voucher, to detect the malicious use attempt.

Accordingly, the systems and/or methods described herein are inextricably tied to computer technology, to overcome an actual technical problem arising in networks and/or computing devices (e.g., a server) hosting a purchase application.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
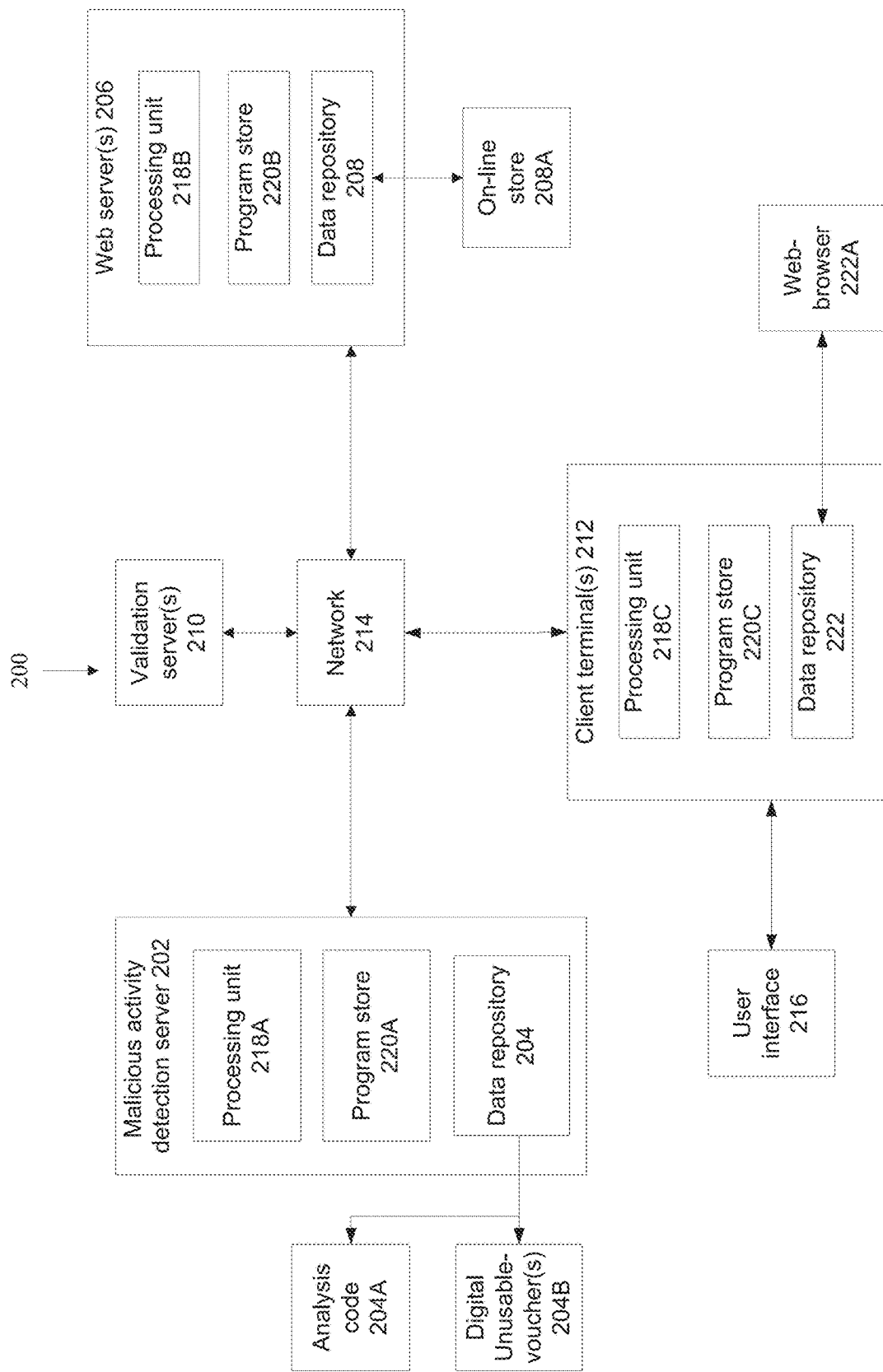
FIG. 2 is a block diagram of components of a system for determining a risk of malicious use of monetary credentials and creating a digital unusable voucher for identifying the malicious use, in accordance with some embodiments of the present invention.

Reference is now made to FIG. 1, which is a flowchart of a method of detecting fraudulent user of monetary credential by creating a digital unusable voucher, in accordance with some embodiments of the present invention. Reference is also made to FIG. 2, which is a block diagram of components of a system 200 that executes analysis code for determining a risk of malicious use of monetary credentials and creating a digital unusable voucher for detecting the malicious use, in accordance with some embodiments of the present invention. System 200 may execute the acts of the method described with reference to FIG. 1, for example, by one or more processors that execute code instructions stored in a data storage device. System 200 and/or the method of FIG. 1 improve network security of online transactions by creating the digital unusable voucher for detecting malicious use of monetary credentials, for example, in cases in which a validation server that validates the monetary credentials is unaware of the theft of the monetary credentials.

System 200 includes a malicious activity detection server 202 that stores analysis code 204A (e.g., stored in a data repository 204) that analyses data denoting the context of the monetary credentials and/or user data and/or other data provided by a user as part of an online transaction (e.g., to purchase a product) to determine a risk of malicious use of the monetary credentials (e.g., stolen credit card number) by the user. Malicious activity detection server 202 stores digital unusable voucher repository 204B that provides (e.g., dynamically generates, obtains from a database) the digital unusable voucher when risk of malicious use of the monetary credentials is detected. It is noted that analysis code 204A and digital unusable voucher repository 204B may be implemented as a single set of code, for example, when the digital unusable voucher is dynamically generated by the analysis code.

Malicious activity detection server 202 may provide services to analyze the monetary credentials and/or provide the digital unusable voucher to one or more web servers 206 that host applications providing online transactions, for example, online stores 208A (e.g., a website stored in a data repository 208) selling physical products, digital products, and/or services.

It is noted that malicious activity detection server 202 may operate independently of web servers 206. For example, data associated with detecting the fraudulent user of the monetary credentials is not necessarily transmitted between malicious activity detection server 202 and web servers 206. The additional security of the online transactions may be provided indirectly to web servers 206.

Alternatively, analysis code 204A may be executed by online store 208A using one or multiple implementations. For example, online store 208A may access analysis code 204A on malicious activity detection server 202 using an application programming interface (API), software development kit (SDK), script, or other code instructions, which may be executed as part of the financial transaction verification process. In another example, web server 206 downloads a copy of analysis code 204A and/or digital unusable voucher 204B from malicious activity detection server 202 for local execution, for example, as a software as a service (SAAS) feature. In yet another example, analysis code 204A is accessed by a validation server 210 as part of a validation process of the monetary credentials, for example, a third party credit card company server may access malicious activity detection server 202 for determining malicious use of the monetary credentials. The indirect access of malicious activity detection server 202 by validation server 210, may be transparent to web server 206.

Malicious activity detection server 202 may communicate with a client terminal 212 performing the financial transaction hosted by web server 206, directly by transmitting the created digital unusable voucher for presentation on a display of client terminal 212, and/or indirectly through web server 206 (e.g., using online store 208A).

Malicious activity detection server 202, web server 206, validation server 210, and client terminal 212 may communicate with one another over a network 214 using respective network interfaces, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Exemplary networks 214 include: the internet, a wireless network, a cellular network, a public network, a private network, or other implementations.

Client terminal(s) 206 may be implemented as, for example, a mobile device, a desktop computer, a thin client, a Smartphone, a Tablet computer, a laptop computer, a server, a wearable computer, glasses computer, and a watch computer.

Exemplary user interfaces 216 include, for example one or more of, a touchscreen, a display, a keyboard, a mouse, and voice activated software using speakers and microphone.

Each of malicious activity detection server 202, web server 206, and client terminal 212, include a respective processing unit 218A-C, a program store 220A-C storing code instructions for execution by the respective processing unit, and optionally a data repository 204, 208, and 222 that stores data.

Processing units 218A-C may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 218A-C may include one or more processors (homogenous or heterogeneous), which may be arranged for parallel processing, as clusters and/or as one or more multi core processing units.

Program stores 220A-C store code instructions implementable by respective processing units 218A-C, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Data repositories 204, 208, and 222 may be implemented as, for example, a memory, a local hard-drive, a removable storage unit, an optical disk, a storage device, and/or as a remote server and/or computing cloud (e.g., accessed using a network connection).

At 102, monetary credentials are received. The money credentials may be received by malicious activity detection server 202. Alternatively, monetary credentials are received by web server 206, optionally by online store 208A or other application based on financial (or financial equivalent, such as vouchers) transactions. In such a case, web server 206 may communicate with malicious activity detection server 202, for example, by forwarding the connection with client terminal 212 to malicious activity detection server 202, via an API and/or SDK, and/or when implemented as malicious activity detection server 202). The money credentials may be manually entered by a user, for example, using user interface 216 (e.g., touchscreen, keyboard, display) and a web browser 222A (e.g., stored in data repository 222) accessing a graphical user interface (GUI) hosted by malicious activity detection server 202. Alternatively or additionally, the money credentials may be automatically provided by code executing on client terminal 212, such as malicious code used by hackers to generate credit card numbers, and/or automatically provided by code associated with web browser 222A of client terminal 212.

The monetary credentials are received (optionally by malicious activity detection server 202) from client terminal 212 as part of a request to obtain a digital voucher having a certain monetary equivalent. The voucher may be provided at a discount to the monetary equivalent of the voucher. For example, a user enters a credit card number to purchase a voucher having a monetary equivalent of $100 at a discounted price of $95.

The voucher is designed as part of an online transaction process (e.g., entered by client terminal 212 accessing online store 208A) to purchase a physical product (e.g., book, jewelry), a virtual product and/or a digital product (e.g., music file, book file, online game), a physical service (e.g., vacation package), and/or a digital service (e.g., online magazine subscription, access to a software package). For example, the user provides the voucher to online store 208A via client terminal 212 for payment for the product and/or service.

First, the user is provided with a digital voucher having a certain monetary equivalent which is purchased with the provided monetary credentials. The digital voucher may be saved as code, and/or presented to the user, for example, as a sequence of letters and/or numbers, for example, jd98h3h98x9y9hss, and/or as code, for example, a quick response (QR) code or bar code that may be printed. The voucher may have a monetary value equal to the provided monetary credentials, or different than the money credentials (e.g., higher due to a bonus or promotion, or lower due to paying off debt). The voucher may be stored for future use at an online store. The user uses the voucher (the entire or partial value of the voucher) to perform the online transaction at one or more online stores.

Exemplary monetary credentials include one or more of: a credit card number, a credit card expiration date, a credit card security code, a PIN (personal identification number), a debit card number, a gift card number, a voucher code, a bank account number, money-equivalent data, gift voucher, branded currency, and a user profile account number.

Data denoting the context of the monetary credentials is collected, optionally by malicious activity detection server 202, and/or received from another server. Exemplary data denoting the context of the monetary credentials includes: a risk profile of the user, the type of monetary credentials, the type of purchase, the value of the purchase, and the velocity of the use of the monetary credentials within the network.

Alternatively or additionally, additional data is received from the user, and/or automatically collected by code instructions (e.g., executing on malicious activity detection server 202, and/or on another server). The additional data may be analyzed with the data denoting the context of the monetary credentials, and/or independent of the data denoting the context of the monetary credentials to identify the malicious use of the monetary credentials. Exemplary additional data includes one or more of: a profile of the user (e.g., username, age, gender, account status, geographical location, previous purchases), third party data (e.g., history of behavior of the user on other sites), empirically collected data (e.g., based on previous malicious activity), behavior of the user (e.g. on the current site and/or other sites, purchasing history, complaints history, return history), and contextual data (e.g., time of day the user is making the purchase, where the user is logging from, network connection being used). The GUI used by the user to provide the monetary credentials may be executing on malicious activity detection server 202, and/or may be executing on validation server 210 which may be accessed by malicious activity detection server 202 by forwarding the connection with client terminal 212 to validation server 210, and/or running a local interface to validation server 210.

At 104, a risk of malicious use of the monetary credentials is determined (e.g., estimated, calculated) according to an analysis of the data denoting the context of the received monetary credentials. The risk determination and/or analysis may be performed by analysis code 204A stored on malicious detection server 202, which may be accessed by web server 206, and/or downloaded to web server 206, and/or by validation server 210.

Optionally, the analysis of the data denoting the context of the received monetary credentials is performed when the monetary credentials are valid for payment of the product, for example, after validation by validation server 210. Such a case may occur, for example, when the monetary credentials have been stolen, and the victim is not yet aware of the theft and has not notified validation server 210 of the theft. The risk of malicious use of the monetary credentials may be automatically triggered by validation of payment for the voucher with the monetary credentials (e.g., by validation serer 210).

Alternatively or additionally, the analysis of the data denoting the context of the received monetary credentials is performed when a new user (e.g., without a previous account, and/or a user absent from activity for a predefined time interval) requests to obtain the digital voucher. Alternatively or additionally, the analysis of the data denoting the context of the received monetary credentials is performed when new monetary credentials are identified as being used, and/or when a set of monetary credentials used by a known user are being used by a different user.

Alternatively or additionally, the analysis to determine the risk of malicious use is performed for every (or select subset) set of monetary credentials and/or every request to obtain the digital voucher.

Alternatively or additionally, the analysis to determine the risk of malicious use is performed based on honey-potting of the monetary credentials. For example, predefined monetary credentials of a fake user may be stored in a secure credit card database. When an attempt at using the predefined monetary credentials is detected, the risk may be determined as high (or other similar value) since it is assumed that the predefined monetary credentials were stolen from the secure credit card database.

Alternatively or additionally, the analysis to determine the risk of malicious use is performed based on honey-potting of the digital vouchers. Such honey-potting may be designed for certain digital vouchers, for example, digital vouchers redeemable at a predefined merchant. For example, the user is presented (e.g., on the GUI) with two (or more) options for purchase of the digital voucher. A first option is indicative of a relatively higher risk of malicious use. The first option is designed for quick execution with relatively less effort, and provides a relatively lower payoff. For example, buy a single $500 voucher at a 1% discount. A second option is indicative of a relatively lower risk of malicious use. The second option is designed to be relatively more time consuming and/or labor intensive, but provides relatively higher payoff. For example, buy four $100 vouchers at a 5% discount. Inventors assume that the malicious user is more likely to take the higher denominations (i.e., quicker fraud, high values) regardless of the discount (e.g., since the malicious user doesn't really pay for the voucher, the discount is irrelevant). In contrast the original user of the monetary credentials (i.e., non-malicious user) is assumed be willing to perform additional work in collecting the additional value from the 4 vouchers of $100 at a 5% discount. The risk according to the honey-potting based on the first and second options is computed according to an assumed tradeoff, which is based different assumptions for malicious and actual (i.e., original, non-malicious) users. Malicious users are assumed to favor higher face-value vouchers which may be obtained with relatively less effort. Actual users are assumed to favor higher discount rates, even when additional effort is required.

The analysis to determine the risk of malicious use may be performed, for example, by a set-of-rules, a mapping function, a regression function(s), a hash-table, a statistical classifier, kernel method, a look-up table, or other automated machine learning methods. As used herein the term, classifier (or statistical classifier) is sometimes used to describe the one or more machine leaning methods used to analyze the data to help detect the malicious use. The set-of-rules and/or statistical classifier may be trained, for example, using a set of data denoting the context of valid monetary credentials and/or other data (e.g., user profile, context) and a set of previously identified data denoting the context of fraudulent user of monetary credentials and/or other data known to be associated with malicious use. In another example, the set-of-rules and/or statistical classifier may include manually defined conditions and/or rules, for example, monetary credentials used by a known user are being used by a different user not related to the known user. The machine learning methods may include supervised learning methods and/or unsupervised learning methods. Exemplary methods include: decision tree learning, association rule learning, clustering, Bayesian network, and support vector machines.

Optionally, the analysis (e.g., by the statistical classifier) calculates a probability or risk that the monetary credentials are associated with malicious use, for example, a value between 0 and 1 or 0 and 100 (or other ranges, optionally normalized). The determination of whether to classify the risk as being of significance (e.g., high risk), or not significant (e.g., low risk), or other classifications may be defined by the operator of malicious activity detection server 202. For example, a 30% risk of malicious use of the monetary credentials may be defined (e.g., by code, or stored in a local database) as an insignificant risk.

Alternatively or additionally, the analysis (e.g., statistical classifier) performs a classification into one or more risk categories associated with malicious use, for example, by a definition stored by malicious activity detection server 202. Exemplary (not necessarily limiting) categories include one or more of:

*High risk category indicative of a high risk of malicious use. The high risk category classification triggers creation and/or providing of the digital unusable voucher.

*Low risk category indicative of a low or negligible risk of malicious use. The low risk category may trigger providing a valid voucher (i.e., the digital voucher that would otherwise be provided to the user) and aborts the digital unusable voucher process.

Optionally, a very high risk category may be defined for classification. The very high risk category is indicative of very high risk or certainty of malicious use, for example, a user attempting to use reportedly stolen monetary credentials, and/or a user having a profile with a history of malicious activity. In such a case, the very high risk category triggers the identified malicious use of the monetary credentials (e.g., block 114) without creating and/or providing the digital unusable voucher.

It is noted that the digital unusable voucher may serve as an additional security evaluation mechanism in cases that fall within the gray zone that cannot or should not be classified early on into malicious use or authorized use.

At 106, a digital unusable voucher is created and/or provided to the client terminal 212 of user via network 214, for example, presented on the display on client terminal 212, and/or transmitted as code instructions for local storage on client terminal 212, and/or printed on a physical substance and mailed to the user, and/or transmitted in a digital format suitable for local printing by a printer in communication with client terminal 212. The digital unusable voucher is invalid for performing online transactions (e.g., purchase of the product), but is designed to be similar to the valid voucher (that would otherwise be provided to the user) that is valid for performing online (e.g., purchase of the product). The digital unusable voucher and valid voucher may be similar in structure (e.g., record definition, field definitions, storage length, characters and/or codes) and/or layout (e.g., GUI elements) and/or presentation (e.g., the digital unusable voucher and the valid voucher when presented on the GUI and/or printed out may look similar to the user). The digital unusable voucher and valid voucher are designed to be indistinguishable to the user.

The digital unusable voucher may be dynamically created by unusable voucher code 204B, and/or retrieved from a storage database of unusable vouchers (e.g., repository 204B). The digital unusable vouchers may be created using code that is similar to code that creates the valid vouchers.

In an alternative implementation of FIG. 1 and/or system 200 of FIG. 2, the monetary credentials are processed for providing the digital voucher having the certain monetary equivalent. For example, the credit card is charged accordingly, funds of a gift card are withdrawn, and/or the bank account is debited according to the debit card. In such a case, no digital unusable-voucher is provided. The digital voucher may or may not be provided. The features described with reference to act 108, relating to use of the digital unusable-voucher are not implemented since no digital unusable-voucher is provided. Instead of the message indicating invalidity of the digital usable-voucher described with reference to act 110, a message indicating an error, and/or to call support and/or the like is presented for example on the client terminal of the user as described with reference to act 110. Acts 112-120 of FIG. 1 are similarity executed, with the appeal of invalidity relating to the message indicating to call support and/or the error message. The alternative implementation may be trigged, for example, when the risk of malicious use is according to a requirement (e.g., threshold) indicative of low risk, for example, below a probability of 0.3. Providing a message indicative of error to user determined as being at low risk of malicious use of monetary credentials enables a more efficient return to the process flow experienced by safe users that do not require authentication. For example, rather than providing the digital unusable voucher and later replacing the digital unusable voucher with the digital voucher, or providing a refund, the process is temporality suspended until the users appeals. When the user appeal is received during the predefined interval of time, the error is removed and/or the digital voucher is provided. Moreover, user dissatisfaction may be reduced by the efficient return to the process.

In yet another alternative implementation of FIG. 1 and/or system 200 of FIG. 2, the monetary credentials are processed for providing the digital voucher having the certain monetary equivalent. For example, the credit card is charged accordingly, funds of a gift card are withdrawn, and/or the bank account is debited according to the debit card. In such a case, no digital unusable-voucher is provided. A delay in providing the digital voucher is created, for example, delivery of a physical version of the digital voucher (e.g., plastic card, paper receipt) is delayed. The features described with reference to act 108, relating to use of the digital unusable-voucher are not implemented since no digital unusable-voucher is provided. Instead of the message indicating invalidity of the digital usable-voucher described with reference to act 110, a message indicating to call support if a delay is experienced in receiving the physical version of the digital voucher is provided, for example on the client terminal of the user as described with reference to act 110. Acts 112-120 of FIG. 1 are similarity executed, with the appeal of invalidity relating to the message indicating to call support in view of the delay. The alternative implementation may be trigged, for example, when the user requests a physical version of the digital voucher. Providing a message indicative of delay in delivery to the user enables a more efficient return to the process flow. For example, rather than providing the digital unusable voucher and later replacing the digital unusable voucher with the digital voucher, or providing a refund, the process is temporality suspended until the users appeals, at which point the delivery of the physical version of the digital voucher may be expedited. Moreover, user dissatisfaction may be reduced by the efficient return to the process.

At 108, the digital unusable voucher is used by the user for attempted performance of the online transaction (e.g., purchase of the product and/or service). Optionally, the user accesses online store 208A with client terminal 212 over network 214. The user selects one or more products and/or services for purchase from online store 208A, and proceeds to pay with the digital unusable voucher, for example, by entering the digital unusable voucher into a GUI hosted by online store 208A via user interface 216 (e.g., keyboard) of client terminal 212.

The digital unusable voucher is processed in the standard manner by online store 208A. It is noted that whether digital unusable voucher denotes malicious use of the monetary credentials or does not denote malicious use of the monetary credentials is transparent to online store 208A. Online store 208A may operate in the normal manner, without necessarily implementing a special configuration and/or installing additional code instructions for detecting malicious use of the monetary credentials. Detection of malicious use of the monetary credentials may be performed by malicious activity detection server 202, without online store 208A being necessarily aware, and/or without modifications to online store 208A being necessary.

The digital unusable voucher, while being invalid, is designed to be recognized by code instructions executed by online store 208A as being an unusable voucher. The recognition of the digital unusable voucher as being invalid may be performed by online store 208A in the standard manner, for example, by applying a process of recognizing an incorrectly entered valid digital voucher, and/or by apply the process of recognizing a junk code. Alternatively, code instructions may identify that the entered voucher as the digital unusable voucher issued by malicious activity detection server 202. The code instructions may identify the user entered voucher as the digital unusable voucher, for example, by looking up the user entered voucher in a database of digital unusable vouchers (e.g., stored in 204B), applying a hash function on the voucher that classifies the voucher as valid, unusable voucher, or invalid error, analyzing the code of the digital unusable voucher, and/or other methods.

At 110, when code instructions executed by online store 208A detect an error in processing of the provided digital voucher (e.g., an error is generated, and/or the digital unusable voucher is recognized), a message is presented to the user indicative of the invalidity of the digital unusable voucher. The message may be displayed in an interface, optionally within the GUI (e.g., a window) on a display of client terminal 212. For example, the message may state that the entered voucher is invalid, expired, not recognized, or has experienced an error.

The message and the GUI interface triggered in response to the digital unusable voucher are similar (optionally same) in appearance to the message and the interface triggered in response to an invalid voucher that is not designed to identify the malicious use. Code instructions may trigger a similar message when the user enters a false voucher, for example, when the user enters a junk voucher code (e.g., 1234 abcd 4567 efgh), and when the user enters the digital unusable voucher. The similar message assists in masking the fact that the entered voucher is the digital unusable voucher, by presenting a message that the user would receive when entering a truly erroneous voucher code. The message is designed to lead malicious users to believe that there is an actual problem with the voucher, rather than suspecting that they were provided with the digital unusable voucher.

It is noted that the message presented on client terminal 212 of the user is selected by online store 208A, which may be blind to whether the voucher entered by the user is a valid voucher with a real error, or whether the voucher entered is the digital unusable voucher issued by malicious activity detection server 202.

An interface (within the same GUI, or another GUI, such as a separate window) is presented on the display of client terminal 212, with a mechanism for the user to enter an appeal of the invalidity of the digital unusable voucher. For example, the user is presented with a button marked 'appeal invalidity', or 'ask for help', or other icons. Fields for the user to fill in with personal details may be presented within the GUI, for example, asking the user for a phone number, an email address, their name, address, and/or other personal identification information. The user may be presented with an icon (e.g., button) to allow the option to speak and/or communicate using instant messaging with a live person to help resolve the invalidity of the entered voucher. Instructions to call a help-desk for help may be presented on the display of client terminal 212.

The appeal GUI interface (e.g., presented message, the information fields to fill in, the option for live help) (which may be presented by online store 208A independent of whether the voucher entered by the user is a valid voucher with a real error, or whether the voucher entered is the digital unusable voucher issued by malicious activity detection server 202) is designed to discourage malicious users from appealing the invalidity, based on the inventor's assumption that malicious users using unauthorized monetary credentials are fearful of being caught, and therefore are unlikely to provide the personal data required as part of the appeal process. Inventors assume that malicious users will not appeal the invalidity message, and will not pursue further action, and therefore may be identified based on the lack of appeal. The appeal GUI interface is designed to encourage authorized users to easily appeal the invalidity, based on the inventor's assumption that users using authorized monetary credentials (e.g., their own credit card) will appeal the decision to prevent financial losses. Such authorized users may be identified by submission of the appeal.

At 112, when a predefined interval of time elapses without the appeal being received from the user, code instructions optionally executing on malicious activity detection server 202 identify that no appeal is entered by the user. The predefined interval may start when the digital invalid voucher is provided to client terminal 212 of the user. The predefined interval may be set according to the expiration date that would be otherwise assigned when the digital valid voucher is provided. Exemplary predefined intervals include: 24 hours, 72 hours, 1 week, 1 month, 3 months, 6 months, a 1 year. Alternatively, the predefined interval may start when the message indicative of invalidity is presented on the display of client terminal 212 of the user. Alternatively or additionally, the predefined interval may terminate, for example, based on one or more methods: closing of a window hosting the interface for entering the appeal, explicit selection by the user not to appeal (e.g., selection of a button and/or icon stating no thank you in the GUI appeal interface that presents the question do you wish to appeal the code invalidity?), and lack of trying again to enter the voucher code.

At 114, malicious use of the monetary credentials is identified by malicious activity detection server 202 when within the elapsed predefined interval of time, no appeal in response to invalidity of the digital usable coupon during an attempt to perform the online transaction is received from the user.

Code instructions (optionally executing on malicious activity detection server 202) designate the user (e.g., according to the user profile) associated with the identified malicious use of the monetary credentials as a malicious user. The current online transaction session (e.g., to purchase the product and/or service) may be terminated. The user may be blocked from accessing online store 208A, other online stores hosted by web server 206, and/or other relates sites. The monetary credentials may be designated as unauthorized monetary credentials, and optionally reported to authorities, for example, a message indicative of the attempt to maliciously use the monetary credentials may be transmitted to validation server 210 for further follow up and/or blocking future attempts to use the monetary credentials.

Optionally, the original user, whose monetary credentials were maliciously used by another, is automatically provided with a refund according to the monetary equivalence of the digital voucher when no appeal is received within the elapsed predefined interval of time, indicating that malicious use is detected. For example, the user is provided with a valid voucher (i.e., another voucher) having the certain monetary equivalent, for example, by malicious activity detection server 202 transmitting the valid voucher to client terminal 212 of the original user. Alternatively, the user is provided with a monetary refund, for example, by malicious activity detection server 202 transmitting a request and/or instructions to a server associated with the maliciously used monetary credentials (e.g., credit card server) to issue a monetary refund towards the maliciously used monetary credentials. The entity associated with the monetary credentials (e.g., credit card company, gift card issuing store, bank that issued the debit card) may be automatically informed of the detected malicious use of the monetary credentials managed and/or issued by the entity, for example, by a message transmitted to a server of the entity, by a push notification of a text message transmitted to a mobile device of an administrator of the entity, by an email addressed to an administrator of the entity, and/or by a GUI presented on a management server of the entity.

Alternatively, at 116, code instructions executing on malicious activity detection server 202 detect that the appeal is received from the user within the predefined interval of time.

For example, the user calls the help-desk number shortly after the message is presented, to inquire about the presented error message.

At 118, authorized use of the monetary credentials is identified when the appeal is received from the user within the predefined interval of time, before the predefined interval of the elapses. The user and/or user profile may be designated as an authorized user. The monetary credentials may be designated as authorized use of the monetary credentials. The user and/or user profile using the authorized monetary credentials may be allowed to performed future transactions on online store 208A, and/or other stores hosted by web server 206, and/or other relates sites based on the designation.

Optionally, the user is provided with a valid voucher (i.e., another voucher) having the certain monetary equivalent, for example, by malicious activity detection server 202 transmitting the valid voucher to client terminal 212 of the user. The valid voucher may be used to perform the online transaction. Alternatively, the user is provided with a monetary refund.

The GUI may display an apologetic message to the user about the error. The user may be provided with an incentive to forgive the invalidity error, for example, by being provided with a discount. Alternatively, the user may be led to believe that the error is due to the user incorrectly entering the voucher code, for example, by asking the user to re-enter the code.

Optionally, at 120, data indicative of the session and outcome is stored, optionally by malicious activity detection server 202, optionally within data repository 204. For example, the profile of the user associated with authorized use of the monetary credentials may be stored, to allow future identification of the user when the user having a similar user profile attempts to perform another online transaction (e.g., purchase another product and/or service) with the monetary credentials.

Optionally, session data associated with the case when malicious use of the monetary credential is detected, and session data associated with the case when authorized use is detected are stored. The data associated with malicious use and the data associated with authorized use may be used to update and/or train the statistical classifier to improve the ability to estimate the risk of malicious use based on the inputted data, and/or improve the classification ability of the classifier based on the inputted data.

The stored session data (when authorized use is detected) may be used to automatically detect authorized use of the monetary credentials (optionally according to the user profile) when the user attempts to perform another online transaction (e.g., purchase another product and/or service) with the same monetary credentials.

The stored session data (when malicious use is detected) may be used to determine malicious use when the stored monetary credentials are provided in an attempt to perform another online transaction (e.g., purchase another product) by the same user or another user.

Optionally, stored data indicative of the user associated with the identified malicious use of the monetary credentials (e.g., user profile) and/or details of the monetary credentials is provided (e.g., access is granted to the data repository, and/or update messages are transmitted) to other servers (e.g., other online stores and/or validation servers) to allow the other servers to block the user associated with the identified malicious use from performing financial transactions using the monetary credentials.

Figure 3:
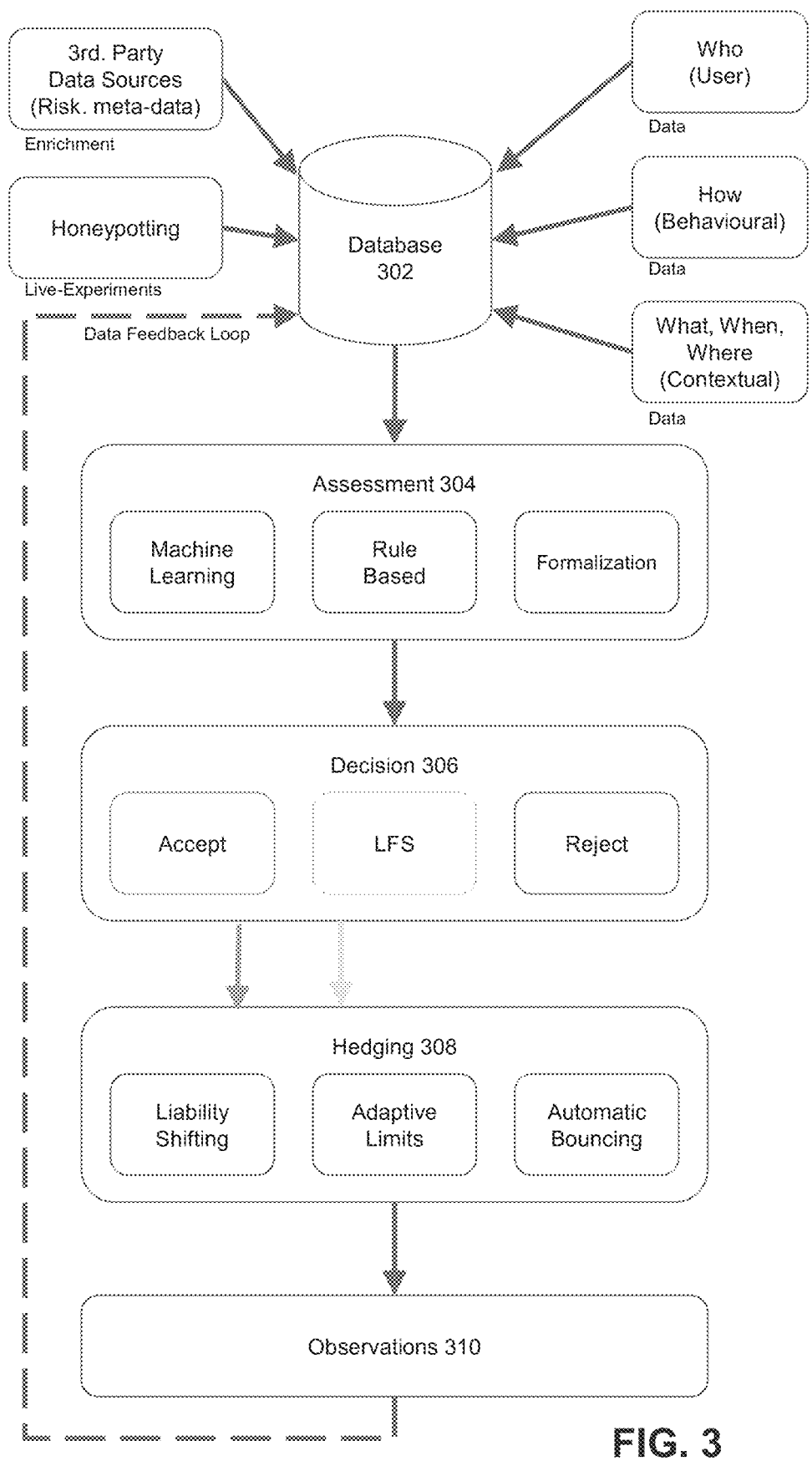
FIG. 3 is a dataflow diagram for detecting fraudulent use of monetary credentials during online transactions based on a digital unusable voucher, in accordance with some embodiments of the present invention.

Reference is now made to FIG. 3, which is a dataflow diagram for detecting fraudulent use of monetary credentials during online transactions based on a digital unusable voucher, in accordance with some embodiments of the present invention. The dataflow diagram of FIG. 3 may be implemented based on the method described with reference to FIG. 1, and/or using system 200 described with reference to FIG. 2.

At 302, data denoting the context of the monetary credentials used to perform an analysis to determine the risk of malicious use of monetary credentials is collected within a database (e.g., stored using a storage device). Exemplary data elements include one or more of: third party data sources, data from honeypotting experiments (e.g., used to lure malicious users to learn their behavior), data indicative of who the current user is (e.g., user profile), data indicative of how the user is behaving (e.g., click patterns, what windows the user is opening), and data indicative of the context of the user attempting the online transaction (e.g., what device the user is using to access the web server, when the user is accessing the web server such as time of day, and where the user is accessing from such as country and city).

The data stored in the database may be used to train and/or update a statistical classifier to determine the risk of malicious use of monetary credentials, as described herein.

At 304, an assessment of the current session of the user requesting to obtain a digital voucher having a certain monetary equivalent using monetary credentials of the user is performed using the data stored in the database. The assessment is performed to determine the risk of malicious use of monetary credentials for the current session. For example, data denoting the context of the monetary credentials from the session (e.g., the monetary credentials, the user profile, contextual data) may be analyzed using machine learning methods (e.g., statistical classifier), a set of rules, formalization methods, and/or other methods.

At 306, a decision is made according to the risk of malicious use of monetary credentials determined by the assessment. A decision is made to accept the current session (i.e., provide the digital usable voucher) when the risk of malicious use is low, for example, according to a risk requirement such as a threshold or range of risk probability, and/or as classified by the classifier. Alternatively, a decision is made to reject the current session (i.e., do not provide any voucher) when the risk of malicious use is high, which may be indicative of certainty or almost certainty of malicious use, for example according to the risk requirement. Alternatively, a decision is made to issue the digital unusable voucher to the user, and further evaluate whether the user is maliciously using the monetary credentials, or whether the user is authorized to use the monetary credentials, as described herein.

At 308, the behavior of the user is monitored to determine what the user does with the digital unusable voucher that is rejected by the code instructions (as described herein). When the user appeals the decision within the predefined period of time, the user is identified as an authorized user. The user may be compensated for the trouble, for example, by issuing a new valid voucher with a higher monetary value. When the predefined period of time elapses and no appeal is received from the user, the user is identified as a malicious user, and may be automatically blocked from the web server for future transactions.

At 310, observation data about the session and outcome is collected and fed back to the database, to update the classifier (and/or set of rules, or other decisions methods), to improve the ability of the classifier in detecting the risk of malicious use.

Figure 4:
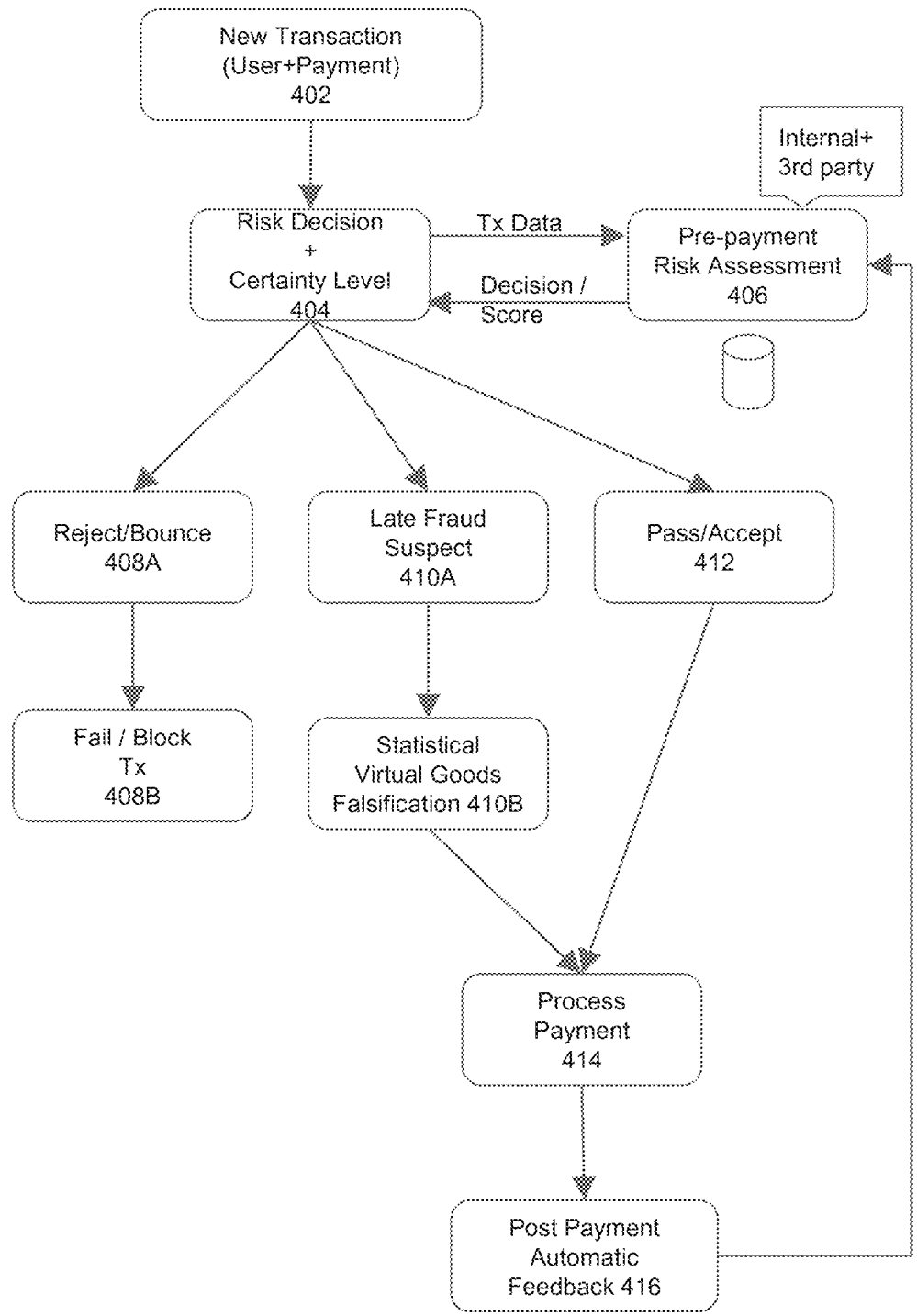
FIG. 4 is another flowchart of a method of detecting fraudulent use of monetary credentials during online transactions based on the digital unusable voucher.

Reference is now made to FIG. 4, which is another flowchart of a method of detecting fraudulent use of monetary credentials during online transactions based on the digital unusable voucher, in accordance with some embodiments of the present invention. The flowchart of FIG. 4 may be implemented based on the dataflow diagram described with reference to FIG. 3, based on the method described with reference to FIG. 1, and/or using system 200 described with reference to FIG. 2.

At 402, a request is received to obtain a digital voucher having a certain monetary equivalent using monetary credentials of a user.

At 404, the risk of malicious use of the monetary credentials is determined. Optionally, the certainty level, for example, an estimated probability, is calculated for the determined risk.

The analysis may be performed by the malicious activity detection server (e.g., as described herein, optionally based on internally collected data and/or third party data) based on data transmitted from a validation server that validates the monetary credentials (at 406) to the malicious activity detection server.

A decision is made according to the determined risk of malicious use of monetary credentials:

At 412, a decision is made to accept the current session and issue a valid digital voucher when the risk of malicious use is low, for example, according to a risk requirement such as a threshold or range of risk probability, and/or as classified by the classifier.

At 408A, a decision is made to reject the current session and not issue any voucher when the risk of malicious use is high, which may be indicative of certainty or almost certainty of malicious use, for example according to the risk requirement. At 408B, the user is designated as a malicious user, and is blocked from the current transaction and/or from performing additional transactions.

At 410A, a decision is made to provide the digital unusable voucher to the user for further evaluation of whether the user is maliciously using the monetary credentials, or whether the user is authorized to use the monetary credentials, as described herein. At 410B, the user attempts to perform an online transaction with the digital unusable voucher (e.g., purchase a product at an online store).

At 414, the online store processes the voucher provided by the user for performing the online transaction in the usual manner. When the provided voucher is a valid voucher, the payment is processed successfully. When the provided voucher is a digital unusable voucher, a message is presented on the client terminal of the user, with instructions on how to appeal the invalidity of the voucher.

Malicious use of the monetary credentials is identified when within an elapsed predefined interval of time, no appeal in response to invalidity of the digital usable coupon during the attempt to perform the online transaction is received from the user.

When the user provides the appeal within the predefined interval of time, malicious use is ruled out. A valid voucher and/or refund is provided to the user. At 416, data about the session and outcome is collected and fed back to the malicious activity detection server, to update the classifier (and/or set of rules, or other decisions methods), to improve the ability of the classifier in detecting the risk of malicious use.

Figure 5:
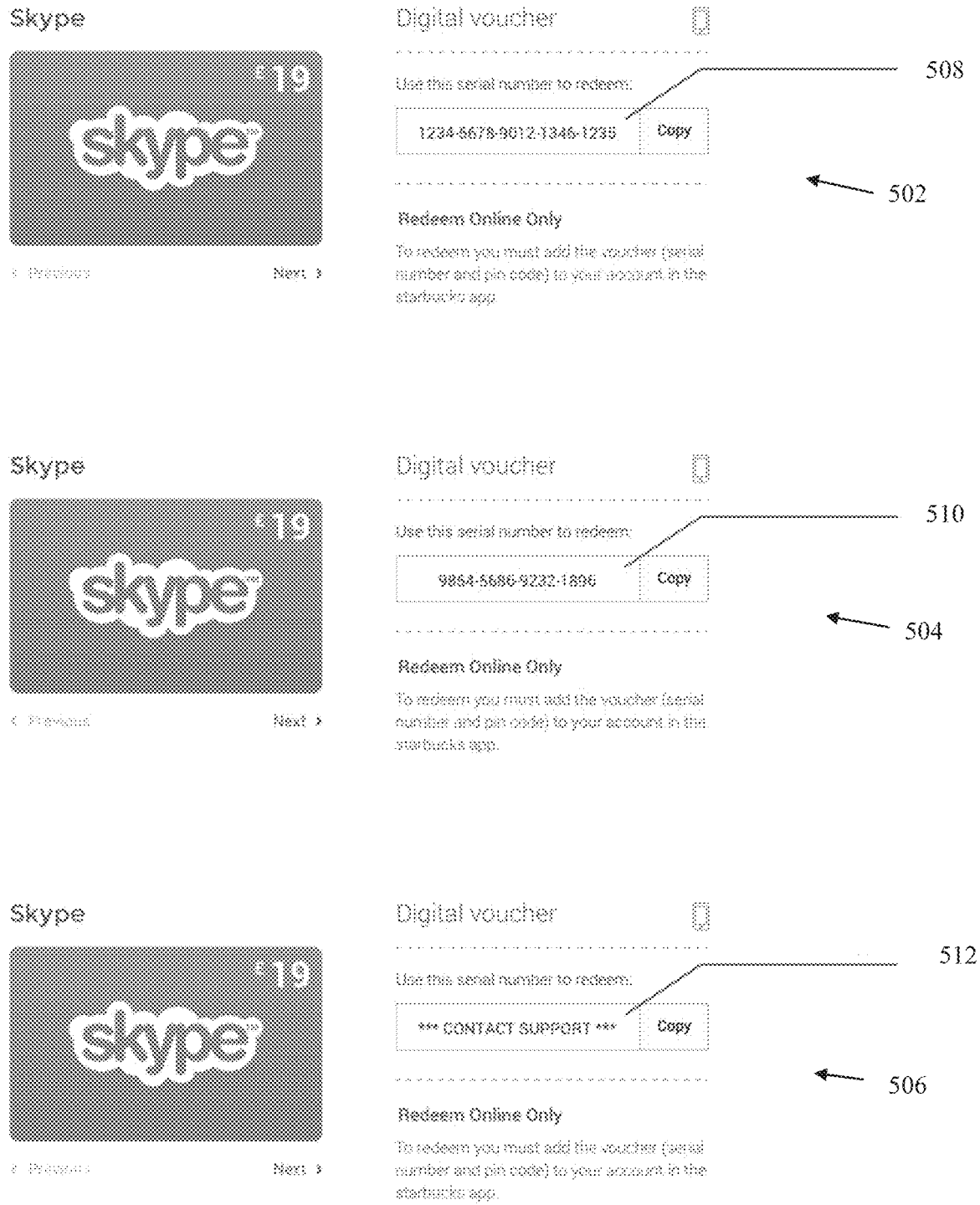
FIG. 5 is a set of exemplary GUIs depicting the process of detecting fraudulent use of monetary credentials during an online transaction, in accordance with some embodiments of the present invention.

Reference is now made to FIG. 5, which includes exemplary GUIs 502-506 depicting the process of detecting fraudulent use of monetary credentials during an online transaction, in accordance with some embodiments of the present invention. GUIs 502-506 may be presented on a display of a client terminal accessing an online store to perform an online transaction, for example, purchase of a product and/or service, as described herein.

GUI 502 depicts entry of a valid voucher 508 (issued by the malicious activity detection server, as described herein) for performing the online transaction. In such a case, valid voucher 508 is successfully redeemed.

GUI 504 depicts entry of a digital unusable voucher 510 (issued by the malicious activity detection server, as described herein) for performing the online transaction. In such a case, an error is generated in the attempt to redeem digital unusable voucher 510, as described herein.

It is noted that as described herein, the process to redeem valid 508 and digital unusable voucher 510 is the same (or similar), optionally performed by the online store, which is blind to the types of voucher.

GUI 506 depicts an exemplary message 512 to contact support, presented on the display of the client terminal of the user (e.g., generated by the online store) in response to the inability to redeem digital unusable voucher 510.

As described herein, malicious use of the monetary credentials is identified when within an elapsed predefined interval of time, the user does not contact support, and no appeal is received from the user. When the user provides the appeal within the predefined interval of time by contacting support, malicious use is ruled out. A valid voucher and/or refund is provided to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant monetary credentials and digital vouchers will be developed and the scope of the terms monetary credentials and digital vouchers are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5 and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system with improved performance in detection of malicious activity in a communication network by generating and transmitting digital invalid vouchers into said communication network, comprising:
    a malicious activity detection server having a first network interface connecting the malicious activity detection server to a communication network, wherein said malicious activity detection server comprises at least one hardware processing unit and a data depository storing analysis code and for storing at least one invalid voucher:
    at least one web server having a second network interface connecting said at least one web server to said communication network, wherein said at least one web server host at least one application providing online transactions; and
    at least one validation server having a third network interface connecting said at least one validation server to said communication network;
    wherein said malicious activity detection server is configured to receive from said at least one web server, over said communication network credentials of a user sending a request from a client terminal via said communication network to said at least one web server, said request is for obtaining a digital voucher having a certain value using said credentials of said user and wherein said malicious activity detection server is further configured to receive from said at least one validation server, via said communication network, data denoting a context of said credentials;
    wherein said malicious activity detection server is configured to analyze said data denoting the context of the credentials by executing said analysis code which uses machine learning algorithm trained on data known to be associated with malicious activity, to determine by said analysis a risk of malicious use of the credentials and to dynamically generate and store in said data depository an invalid voucher, according to the risk determination of malicious use of the credentials, wherein the digital invalid voucher is structurally similar to a valid voucher;

wherein said malicious activity detection server is further configured to transmit said invalid voucher to the client terminal via the communication network, in response to the request to obtain the digital voucher, instead of providing the client terminal the requested digital voucher and is further configured to monitor at least one interactive User Interface (UI) mechanism generated by the at least one web server and presented on the client terminal, said at least one UI mechanism allows the user who received the invalid voucher to submit an appeal, during a predefined interval of time, as a response of the user to invalidity of the digital invalid voucher during an attempt, of the user, to redeem the invalid voucher through a transaction between said client terminal and said at least one application of said at least one web server;

wherein said malicious activity detection server is configured to transmit to said validation server, over said communication network, a message indicative of an attempt of malicious use of said credentials when said malicious activity detection server identifies that an output of each of said at least one monitored UI mechanism does not indicate that said appeal was submitted by the user within the predefined interval of time; and wherein said detection of said malicious use of the monetary credentials is performed by said malicious activity detection server without said at least one application hosted by said at least one web server and providing online transactions being aware of said detection.

2. The system of claim 1, wherein a valid digital voucher having the certain value is provided to the client terminal via the network, when within the elapsed predefined interval of time, the appeal is received from the user.

3. The system of claim 1, wherein said malicious activity detection server is further configured to identify authorized use of the credentials when within the elapsed predefined interval of time, the appeal is received from the user.

4. The system of claim 1, wherein said malicious activity detection server is further configured to store in said data depository a profile of the user associated with authorized use of the credentials, and automatically detect authorized use of the credentials according to the profile when the user provides another request to obtain another digital voucher using the credentials.

5. The system of claim 1, wherein said malicious activity detection server is further configured to instruct providing a refund to the user when within the elapsed predefined interval of time, the appeal is received from the user.

6. The system of claim 1, wherein said malicious activity detection server is further configured to designate the user associated with the identified malicious use of the credentials as a malicious user and reject future requests to obtain the digital voucher by the malicious user.

7. The system of claim 1, wherein said malicious activity detection server is further configured to
receive additional data associated with at least one of the user and the credentials, and wherein the analysis to determine the risk of malicious use of the credentials is based on the additional data.

8. The system of claim 7, wherein the additional data includes one or more members selected from the group consisting of: third party data, empirically collected data, a profile of the user, behavior of the user, and contextual data.

9. The system of claim 1, wherein said malicious activity detection server is further configured to store in said data depository, the credentials and the identified malicious use of the credentials, and to determine the risk of malicious use when the stored credentials are used in another request to obtain another digital voucher.

* * * * *